United States Patent
Dwivedi

(10) Patent No.: US 10,327,466 B2
(45) Date of Patent: Jun. 25, 2019

(54) ALL NATURAL FRUIT SNACK AND METHOD OF MANUFACTURING AN ALL NATURAL FRUIT SNACK

(71) Applicant: The Promotion In Motion Companies, Inc., Allendale, NJ (US)

(72) Inventor: Basant K Dwivedi, Randolph, NJ (US)

(73) Assignee: THE PROMOTION IN MOTION COMPANIES, INC., Closter, NJ (US)

(*) Notice: Subject to any disclaimer, the term of this patent is extended or adjusted under 35 U.S.C. 154(b) by 0 days.

(21) Appl. No.: 14/958,201

(22) Filed: Dec. 3, 2015

(65) Prior Publication Data
US 2016/0088863 A1    Mar. 31, 2016

Related U.S. Application Data

(62) Division of application No. 12/760,075, filed on Apr. 14, 2010, now abandoned.

(60) Provisional application No. 61/169,740, filed on Apr. 16, 2009.

(51) Int. Cl.
| | | |
|---|---|---|
| *A23G 3/48* | (2006.01) | |
| *A23L 29/231* | (2016.01) | |
| *A23G 3/34* | (2006.01) | |
| *A23P 30/10* | (2016.01) | |
| *A23L 29/256* | (2016.01) | |
| *A23L 29/281* | (2016.01) | |
| *A23L 21/15* | (2016.01) | |
| *A23L 19/00* | (2016.01) | |

(52) U.S. Cl.
CPC .......... *A23L 29/231* (2016.08); *A23G 3/0025* (2013.01); *A23G 3/48* (2013.01); *A23L 19/09* (2016.08); *A23L 21/15* (2016.08); *A23L 29/256* (2016.08); *A23L 29/284* (2016.08); *A23P 30/10* (2016.08); *A23V 2002/00* (2013.01)

(58) Field of Classification Search
CPC ...... A23L 29/231; A23L 19/09; A23L 29/284; A23G 3/48; A23G 3/0025
See application file for complete search history.

(56) References Cited

U.S. PATENT DOCUMENTS

| | | |
|---|---|---|
| 4,355,050 A | 10/1982 | Butland |
| 4,567,055 A | 1/1986 | Moore |
| 4,753,816 A | 6/1988 | Vink et al. |
| 4,853,236 A | 8/1989 | Langler |
| 6,077,557 A | 6/2000 | Gordon |
| 2002/0168460 A1* | 11/2002 | Soumya .............. A23G 3/0268 426/575 |
| 2005/0260329 A1 | 11/2005 | Yusuf et al. |

FOREIGN PATENT DOCUMENTS

| | | |
|---|---|---|
| GB | 1369198 A | 10/1974 |
| JP | 60-009456 | 1/1985 |
| JP | 61-012256 | 1/1986 |
| JP | 63-304947 | 12/1988 |
| JP | 1991-201953 A | 3/1991 |
| JP | 03-083550 A | 4/1991 |
| JP | 03133342 A | 6/1991 |
| JP | 03216154 A | 9/1991 |
| JP | 05219891 A | 8/1993 |
| JP | 06-090688 | 4/1994 |
| JP | 10-257854 A | 9/1998 |
| JP | 11-146761 A | 6/1999 |
| JP | 2005-013212 A | 1/2005 |

OTHER PUBLICATIONS

EGForums "Gelatin" pp. 1-12 eGForums 2004-2005 https://forums.egullet.org/topic/50476-gelatin/.*
Bates et al "Principles and practices of small- and medium-scale fruit juice processing" FAO Agricultural Services Bulletin 146 2001, pp. 75, 76, 83 and 84.*
English Translation of Japanese OA dated Aug. 5, 2014 corresponding to Japanese OA JP2012-506161, pp. 1-12.
Nicole Brechka, "Kids just wanna have fun", Better Nutrition, Jul. 2007, vol. 69, Issue 7, p. 18.
"Fruitabu Smooshed Fruit—Organic Fruit Twirls Grape 4.40 oz Foodtown Supermarkets", www.foodtown.com, Jul. 30, 2014, http://www.foodtown.com/pd/Fruitabu/Smooshed-Fruit-Organic-Fruit-Twirls-Grape/4-40-oz/079126330025/, pp. 1-4.
Dare, Real Fruit Gummies Fruit Snacks, Orchard Fruits, 6. 4-Once Bags (Pack of 12). Amazon.com [online] http://www.amazon.com/candyblog/Gummies-Snacks-Orchard-Fruits-6-4Once/dp/BoooFFAK9G/r . . . Available: Oct. 25, 2007 Retrieved from the internet May 19, 2010, pp. 1-6.
Kasugai "Kasugai Pineapple Gummy" Candy Blog [online] http://www.candyblog.net/blog/item/Kasugai_pineapple_gummy/. Available: Aug. 6, 2008 Retrieved from the internet May 19, 2010, pp. 1-6
International Application No. PCT/US10/31038, pp. 1-8, dated Jul. 8, 2010.
XP002686051, Database GNPD [Online] MINTEL; Mar. 2008 Anonymous: "Wild Kingdom Fruit Snacks", pp. 1-2.
XP002686052,Database GNPD [Online] MINTEL; Nov. 2007 Anonymous: "Healthy Treats Fruit and Juice Snacks", pp. 1-2.

(Continued)

*Primary Examiner* — Kelly J Bekker
(74) *Attorney, Agent, or Firm* — Cowan, Liebowitz & Latman, P.C.; Mark Montague

(57) ABSTRACT

A fruit snack manufactured, in summary, by removing moisture from commercially available juice concentrates (e.g., containing about 30% moisture) by heating for a short time the juice concentrate and vacuuming away excess moisture to produce a fruit juice concentrate with about a 15 to 20% moisture content, mixing the reduced moisture content fruit juice concentrate with fruit purees and gelling agents, preferably both pectin and gelatin, to produce a cooked mass, and depositing the cooked mass in a Mogul machine to produce the molded fruit snack.

11 Claims, No Drawings

(56) References Cited

OTHER PUBLICATIONS

XP002686053, Database GNPD [Online] MINTEL; Jul. 1999 Anonymous: "Gummi Bears with Fiber", p. 1.
XP002686054, Database GNPD [Online] MINTEL; Apr. 1999 Anonymous: "Bear Bites Fruit Snacks", p. 1.
XP000453994, Mason Publications, Hampshire, GB, No. 361, May 1, 1994, p. 276-277, "Production of Low Calorie (Low Juice) or Sugar-Free Jelly Sweets (Jubes) Using Polydextrose and Gellan Gum, Where Final Total Solids Exceeds 80%", p. 1.
European Search Report dated Nov. 9, 2012, issued in the corresponding European Patent Application No. 10765089.7, dated Nov. 9, 2012, pp. 1-8.

* cited by examiner

100 # ALL NATURAL FRUIT SNACK AND METHOD OF MANUFACTURING AN ALL NATURAL FRUIT SNACK

REFERENCE TO RELATED APPLICATION

This application is a divisional application of U.S. application Ser. No. 12/760,075, filed on Apr. 14, 2010, which claims priority to U.S. provisional application No. 61/169,740, filed Apr. 16, 2009. The entire content of each of the above applications is incorporated herein by reference.

FIELD OF THE INVENTION

The present invention pertains to a fruit-based snack and a method of a manufacturing such a product that contains only natural ingredients and does not contain sugars or corn syrup, and has various desirable other characteristics as described below.

BACKGROUND OF THE INVENTION

Confectionery items such as licorice, jelly beans, and sugared jellies made with sugar, water, and food starches have been popular for decades. These confections have a firm, yet pliable texture which contributes to their desirable eating quality. These confections are typically manufactured by a starch mold casting process known as the Mogul system. In this process, the liquid ingredient blends consisting of sugar, corn syrup, food starch and other food ingredients are heat processed at a temperature above the boiling point of the liquid mixture until a moisture level above that of the finished confection is reached and the starch is fully gelatinized. In a typical production process of a commercial Mogul system, the ingredients are heat processed at a moisture level of about 20 to 25 weight percent at a temperature of about 250° to 350° F. for less than 1 minute. The starch is generally an acid-thinned (also known as thin-boiling) commercial corn starch or a high-amylose starch or a blend thereof. After heat processing, the hot liquid mixture is deposited into a starch mold. The starch mold defines the shape of the confection and helps to reduce the moisture content. The deposited confections are then routinely dried for about 24 to 72 hours to reach the desired moisture content of about 14 to 20 weight percent.

Confections called fruit snacks that are produced by the above process and include a certain percentage of fruit juices and fruit purees have become very popular with consumers because of their healthy connotation. The heat processed fruit snack mixture must set quickly in the starch molds in order to avoid molding starch getting imbedded in the deposited pieces. Thin boiling starch along with sugar and corn syrup in the formulation functions as a quick setting agent. Some starch in the fruit snack formulation can be replaced with gelatin. Replacing all the starch produces a tough gummy bear or wine gum type texture and is not desirable. Sugar and corn syrup are also essential ingredients in the process. A significant reduction in the sugar and corn syrup content of the formulation gives a sticky/tacky surface that is difficult to manage on packaging equipment. The sticky/tacky texture is also not desirable from a consumer appeal point of view. For the foregoing reasons, it is has not been heretofore possible to produce a good quality fruit snack produced from fruit juices and purees without the use of acid thinned starches alone or in combination with gelatin.

OBJECTS AND SUMMARY OF THE INVENTION

In view of the foregoing, it is an object of the present invention to provide a formulation for a fruit based snack, and a manufacturing method thereof, that maintains all the desirable characteristics of such types of products, including a chewy soft texture, without the use of sugars and corn syrups.

It is a further object of the present invention to provide a fruit-based snack that includes only fruit-based products as sweetening agents.

It is another object of the present invention to produce a fruit-based snack that contains only natural ingredients.

It is yet a further object of the present invention to provide a fruit-based snack that can be produced by traditional manufacturing processes, such as starch molding.

It is yet another object of the present invention to provide a formulation of a fruit-based product that maintains an excellent eating quality, has an extended shelf life, and maintains the other desirable eating characteristics, while retaining healthy nutrients.

In accordance with the present invention, a fruit snack is manufactured, in summary, by providing fruit juice concentrate having a moisture content of substantially 15% to 20%, mixing the fruit juice concentrate with fruit purees, mixing the fruit juice concentrate with a gelling agent, and depositing the fruit juice concentrate with the fruit purees and the gelling agent in a Mogul machine to produce the fruit snack product.

Also in accordance with the present invention, a process of manufacturing a fruit snack product includes the step of providing fruit puree, a flavoring agent, a stabilizer, an acidulant, fruit flavoring, and fruit juice having a moisture content of substantially 15% to 20%.

Further, in accordance with the present invention, a process of manufacturing a fruit snack product includes the step of providing fruit juice, fruit puree, a flavoring agent, gelatin, pectin, and fruit flavoring, the gelatin and the pectin being provided in a ratio of about 10 to 1.

Still further in accordance with the present invention, a process of manufacturing a fruit snack product includes the step of providing a mixture consisting of fruit puree, a flavoring agent, gelatin, pectin, a stabilizer, an acidulant, a coloring agent, fruit flavoring, and fruit juice having a moisture content of substantially 15% to 20%.

As an aspect of the present invention, the process may entail providing fruit juice concentrate having substantially a 30% moisture content, heating the provided fruit juice concentrate to a temperature of substantially between 250 to 300 degrees Fahrenheit for a predetermined period of time, and vacuuming excess moisture from the heated fruit juice concentrate to produce fruit juice concentrate having substantially a 15% to 20% moisture content.

As a further aspect of the present invention, the step of providing the fruit juice includes the steps of providing the fruit juice having substantially a 30% moisture content and reducing the moisture content of the provided fruit juice to produce said fruit juice having substantially the 15% to 20% moisture content.

As an additional feature of this aspect, the step of reducing the provided fruit juice includes heating the provided fruit juice and vacuuming moisture from the heated fruit juice.

As still a further feature of this aspect, the step of heating the provided fruit juice comprises heating the provided fruit juice to a temperature of substantially between 250 to 300 degrees Fahrenheit for a predetermined period of time.

As yet another feature of this aspect, the process includes curing the vacuumed fruit juice for a predetermined period of time.

As another aspect of the present invention, the gelling agent is a combination of gelatin and pectin.

As a feature of this aspect, both the gelatin and pectin are used as texturing agents. As another feature, the gelatin comprises 1 part gelatin and two parts water.

As a further aspect of the present invention, the produced fruit snack product has a translucent appearance.

As an additional aspect of the present invention, natural colors and flavors are added during manufacturing of the fruit snack product.

As yet another aspect of the present invention, the produced fruit snack product is cured for substantially 24 hours.

As yet a further aspect of the present invention, the fruit juice is pineapple juice concentrated to substantially 80 Brix.

As yet an additional aspect of the present invention, the fruit purees include apple puree.

As yet another aspect of the present invention, the fruit snack product does not include added sugars or corn syrups.

As an additional aspect of the present invention, the flavoring agent comprises tri-sodium citrate.

Various other objects, advantages and features of the present invention will become readily apparent to those of ordinary skill in the art from the following detailed description of the invention.

DETAILED DESCRIPTION OF THE PRESENT INVENTION

Currently, it is generally believed in the industry that it is impossible to produce an acceptable fruit snack using only natural ingredients and without the use of acid-thinned starches. Modified starches can't be used because they are chemically modified and are not considered natural. Using gelatin as the texturing agent produces an undesirable very tough, gummy-type texture, as illustrated in examples 6 and 7 discussed below. Reducing the amount of gelatin in the formulation unacceptably results in products not setting properly and, moreover, provides a thick crust of starch after the products are cured. Other natural texturing agents similarly do not produce an acceptable all-natural fruit snack. For example, using pectin as the texturing agent, as illustrated in examples 5 and 8 below, resulted in the product setting-up too quickly in the depositing hopper. In addition, the final product did not set-up properly and was covered with starch.

Despite the current beliefs and the dissatisfactory results achieved with various formulations, such as illustrated in Examples 2 through 8 below, the fruit snack of the present invention is all-natural, has an excellent, chewy soft texture, and does not contain sugars or corn syrups. The fruit snack of the present invention includes only fruit-based products as sweetening agents, has an extended shelf life and other desirable characteristics mentioned herein. As described in further detail below, the fruit snack of the present invention may be manufactured using traditional manufacturing processes.

A fruit snack having the foregoing attributes is manufactured in accordance with the present invention in multiple steps, as herein described. Initially, fruit juice concentrate having a 15 to 20% moisture content is provided. Such fruit juice concentrate may be obtained by using commercially available juice concentrates, which generally contain about 30% moisture, and removing some of the moisture. Typically, the commercially available fruit juice concentrate is heated to about 250 to 300 degrees Fahrenheit for a short time and excess moisture is vacuumed off to produce the concentrate with 15 to 20% moisture content.

The reduced moisture content juice concentrate then is mixed with fruit purees and further is mixed, in accordance with the present invention, with gelling agents comprised of a combination of gelatin and pectin. In the exemplary formulation shown in Example 1 below, by using both gelatin and pectin as the texturing agents, the heat-processed mass did not set-up in the depositing hoppers and the finished product had an excellent texture and eating quality and, further, the produced fruit snack pieces were not covered with starch residue. Still further, the resulting product had a highly desirable translucent appearance.

The cooked mass, which contains the reduced moisture content juice concentrate, fruit purees, gelatin and pectin, is deposited on a Mogul machine to produce the final product. Since the design and operation of a Mogul machine is well known to a person of ordinary skill in the art, a detailed description of a Mogul machine, including the different designs and operations thereof, is not provided herein.

Natural colors and flavors preferably are added to the processed mass on a continuous basis. The product then is cured for a set period of time, e.g., 24 hours.

EXAMPLE 1

In this Example 1, the fruit snack in accordance with the present invention was manufactured using the ingredients shown in Table 1 below. Initially, the pineapple juice concentrate was further concentrated to about 80 Brix. Apple puree and pectin then were thoroughly mixed in with the pineapple juice concentrate.

A gelatin solution consisting of 1 part gelatin and two parts water was homogeneously mixed into the mixture, which then is further processed to a Brix of 77 at 190 degrees Fahrenheit using heat and vacuum evaporation. Natural colors and flavors were added to the processed mass on a continuous basis and deposited in starch molds with cavities of about 1.5 CC volume by pumping the cooked mass to a starch molding machine.

After a 24-hour curing period, the product was judged to be highly acceptable for taste, flavor, texture and appearance.

TABLE 1

| INGREDIENT | PERCENTAGE |
| --- | --- |
| Pineapple Juice Conc. (80 Brix) | 76.25 |
| Apple Puree | 7.45 |
| Tri-sodium citrate | 0.50 |
| Gelatin | 10.5 |
| Pectin | 1.00 |
| Citric acid | 0.40 |
| Natural Flavor | 1.50 |
| Natural Color | 2.00 |
| Vitamin C | 0.40 |

As described above, the formulation of the fruit snack of the present invention includes both gelatin and pectin, which unexpectedly advantageously increased the setting time of the heat processed mass, thus making it possible to deposit the product in starch molds. Moreover, although the product had a very low viscosity at the depositing stage, the liquid molten mass unexpectedly advantageously did not attract the starch, and the product set-up cleanly.

Accordingly, the snack product of the present invention manufactured as herein described has the above-mentioned advantageous features and characteristics, including being all-natural, having a chewy soft texture, having only fruit-based products as the sweetening agents, does not include sugars or corn syrups, has an extended shelf life, and is capable of being manufactured using traditional manufacturing processes.

By way of comparison, fruit snacks were also created in the manners set forth in Examples 2-8 discussed below.

EXAMPLE 2

Using the ingredients shown in Table 2 below, pineapple juice concentrate of about 72 Brix was concentrated further to about 80 Brix under heat and vacuum. Apple puree concentrate of about 30 Brix was thoroughly mixed with the pineapple juice concentrate and processed to a temperature of 190 F and 77 Brix. The cooked mass was pumped to a starch molding machine while continuously injecting acids consisting of vitamin C and citric acid, and colors and flavors and deposited in cavities of about 1.5 CC volume. The product was allowed to set for 24 hours at 65 degrees F. The product was discarded because it did not set and was inedible. The fruit snack pieces also showed a large amount of imbedded starch in them.

TABLE 2

| INGREDIENT | PERCENTAGE |
| --- | --- |
| Pineapple Juice Concentrate (80 Brix) | 87.00 |
| Apple Puree Concentrate | 8.70 |
| Citric acid | 0.40 |
| Natural Flavor | 1.50 |
| Natural Color | 2.00 |
| Vitamin C | 0.40 |

EXAMPLE 3

Using the ingredients shown in Table 3 below, white grape juice concentrate was further concentrated to about 80 Brix, as in Example 2. Apple puree and carrageenan gum were thoroughly mixed in the white grape juice concentrate using a high speed mixer for complete dispersion. The batch was then further processed as in Example 2 and the concentrated mass was deposited in starch molds at about 190 degrees F. The batch was discarded because it set very quickly in the depositing hoppers and the piping and could not be molded satisfactorily.

TABLE 3

| INGREDIENT | PERCENTAGE |
| --- | --- |
| White Grape Juice Conc. (80 Brix) | 84.50 |
| Apple Puree Conc. | 8.70 |
| Carrageenan gum | 2.50 |
| Citric acid | 0.40 |
| Natural Flavor | 1.50 |
| Natural Color | 2.00 |
| Vitamin C | 0.40 |

EXAMPLE 4

A batch was prepared as in Example 2, but processed and deposited to a final temperature of 220 degrees F. The product could not be molded satisfactorily. It also produced a pronounced burnt flavor.

EXAMPLE 5

Using the ingredients shown in Table 5 below, apple juice concentrate was further concentrated to about 80 Brix, as in Example 2. Apple puree and pectin powder were thoroughly mixed with the concentrated apple juice with a high speed mixer and further processed as in Example 2. After a 24-hour setting/curing period, the product showed uneven set and had a large amount of imbedded starch. The eating quality of the product was unsatisfactory.

TABLE 5

| INGREDIENT | PERCENTAGE |
| --- | --- |
| Apple Juice Conc. (80 Brix) | 84.50 |
| Apple Puree Conc. | 8.70 |
| Pectin | 2.50 |
| Citric acid | 0.40 |
| Natural Flavor | 1.50 |
| Natural Color | 2.00 |
| Vitamin C | 0.40 |

EXAMPLE 6

Using the ingredients shown in Table 6 below, pineapple juice concentrate was further concentrated to about 80 Brix. Apple puree and a gelatin solution consisting of 2 parts water and one part gelatin were thoroughly mixed with the pineapple juice concentrate and heat processed under vacuum to 77 Brix and 190 degrees F. The batch was further processed as in Example 2. After a 24-hour curing period, the product was tested for overall eating quality. While the product showed excellent appearance and desirable aroma, it was quite tough and more like a gummy bear than a fruit snack.

TABLE 6

| INGREDIENT | PERCENTAGE |
| --- | --- |
| Pineapple Juice Conc. (80 Brix) | 75.70 |
| Apple Puree Conc. | 6.00 |
| Gelatin | 14.00 |
| Citric acid | 0.40 |
| Natural Flavor | 1.50 |
| Natural Color | 2.00 |
| Vitamin C | 0.40 |

EXAMPLE 7

Using the ingredients shown in Table 7 below, a production batch was processed as in Example 6. The only difference between the batches was the amount of gelatin (as well as the amount of juice and puree concentrate). After a 24-hour curing period, the product was judged to be unacceptable because of a large amount of imbedded starch in the pieces.

TABLE 7

| INGREDIENT | PERCENTAGE |
|---|---|
| Pineapple Juice Conc. (80 Brix) | 78.10 |
| Apple Puree Conc. | 7.60 |
| Gelatin | 10.00 |
| Citric acid | 0.40 |
| Natural Flavor | 1.50 |
| Natural Color | 2.00 |
| Vitamin C | 0.40 |

EXAMPLE 8

Using the ingredients shown in Table 8 below, apple juice concentrate was further concentrated to about 80 Brix as in Example 2. Apple puree and pectin powder were thoroughly mixed with the concentrated apple juice with a high speed mixer and further processed as in Example 2. The cooked mass could not be satisfactorily deposited in the starch molds because it setup too fast. After a 24 hour curing period, the product showed a tough set. The eating quality of the product was unsatisfactory.

TABLE 8

| INGREDIENT | PERCENTAGE |
|---|---|
| Apple Juice Conc. (80 Brix) | 85.10 |
| Apple Puree Conc. | 6.60 |
| Pectin | 4.00 |
| Citric acid | 0.40 |
| Natural Flavor | 1.50 |
| Natural Color | 2.00 |
| Vitamin C | 0.40 |

Having described the present invention, the following claims are representative of the fruit snack product of the present invention. The present invention further comprises a method of manufacturing the fruit snack as described herein.

Therefore, it is intended that the appended claims be interpreted as including the embodiments described herein, the alternatives mentioned above, and all equivalents thereto.

What is claimed is:

1. A process of manufacturing a fruit snack product, comprising the steps of:
    heating fruit juice concentrate having substantially a 30% moisture content,
    vacuuming moisture from the heated fruit juice concentrate;
    mixing the heated and vacuumed fruit juice concentrate with a fruit puree;
    mixing the heated and vacuumed fruit juice concentrate and fruit purees with a gelling agent to produce a mixture of the heated and vacuumed fruit juice concentrate, the fruit purees and the gelling agent;
    heating the mixture;
    vacuuming excess moisture from the heated mixture to produce a 15% to 20% moisture content, and
    depositing the heated and vacuumed mixture in a Mogul machine to produce the fruit snack product,
    wherein the fruit snack product consists of the fruit juice concentrate to obtain a moisture content of substantially 20%, the fruit puree, tri-sodium citrate, gelatin, pectin, citric acid, natural flavor, natural color and vitamin C.

2. The process of claim 1, wherein the gelatin and the pectin are provided in a ratio of about 10 to 1.

3. The process of claim 1, wherein the gelatin comprises 1 part gelatin and two parts water prior to mixing the gelling agent with the fruit juice concentrate.

4. The process of claim 1, wherein the produced fruit snack product has a translucent appearance.

5. The process of claim 1, comprising curing the produced fruit snack product for substantially 24 hours.

6. The process of claim 1, wherein the fruit juice concentrate is pineapple juice concentrate.

7. The process of claim 1, wherein the fruit puree is apple puree.

8. The process of claim 1, wherein the fruit juice and fruit purees are derived from only fruit-derived ingredients.

9. The process of claim 1, wherein the fruit snack product contains only natural ingredients.

10. The process of claim 1, wherein the mixture is heated to about 190 degrees Fahrenheit.

11. The process of claim 1, wherein the fruit juice concentrate is pineapple juice concentrate and the fruit puree is apple puree, and wherein the pineapple juice concentrate is about 76.25% of the fruit snack product, the apple puree is about 7.45% of the fruit snack product, the tri-sodium citrate is about 0.50 of the fruit snack product, the gelatin is about 10.5% of the fruit snack product, the pectin is about 1.0% of the fruit snack product, the citric acid is about 0.40 of the fruit snack product, the natural flavor about 1.50% of the fruit snack product, the natural color is about 2.0% of the fruit snack product, and the vitamin C is about 0.40% of the fruit snack product.

* * * * *